United States Patent [19]

Stearn

[11] Patent Number: 6,047,439
[45] Date of Patent: Apr. 11, 2000

[54] CASTER WHEEL WITH RELEASABLE BEARING ASSEMBLY

[75] Inventor: Shawn Stearn, Oak Park, Ill.

[73] Assignee: Emerson Power Transmission Corp., Aurora, Ill.

[21] Appl. No.: 09/174,512

[22] Filed: Oct. 16, 1998

[51] Int. Cl.[7] ..................................................... B60B 33/00
[52] U.S. Cl. ......................................... 16/30; 16/20; 16/38
[58] Field of Search .................................. 16/20, 21, 30, 16/38, 39, 19; 403/155, 154

[56] References Cited

U.S. PATENT DOCUMENTS

| | | | |
|---|---|---|---|
| 1,045,013 | 11/1912 | Fryberg et al. ............................. | 16/30 |
| 2,478,035 | 8/1949 | Babcock ...................................... | 16/21 |
| 3,662,428 | 5/1972 | Koehl .......................................... | 16/39 |
| 4,054,964 | 10/1977 | Kaneko ....................................... | 16/20 |
| 4,494,271 | 1/1985 | Perlin et al. ................................. | 16/30 |
| 4,788,741 | 12/1988 | Hilborn ....................................... | 16/38 |
| 5,347,681 | 9/1994 | Wattaon ...................................... | 16/38 |
| 5,594,974 | 1/1997 | Wattson et al. ............................. | 16/30 |

*Primary Examiner*—Chuck Y. Mah
*Attorney, Agent, or Firm*—Leydig, Voit & Mayer, Ltd.

[57] ABSTRACT

An inexpensive and easily replaceable caster wheel assembly is provided for use with a cart, dolly or other similar product. The caster wheel assembly includes a mounting flange, a bearing assembly comprising inner and outer bearing races disposed within an opening of the mounting flange, a yoke having a rotatable wheel, and a retention member for releasably securing the yoke to the bearing assembly. In one embodiment, the inner race of the bearing assembly has a depending extension and a snap ring secures the extension in operative relation to the yoke. In an alternative embodiment, the yoke has an upstanding connecting element and a set screw releasably secures the connecting element in operative relation to the inner bearing race.

37 Claims, 2 Drawing Sheets

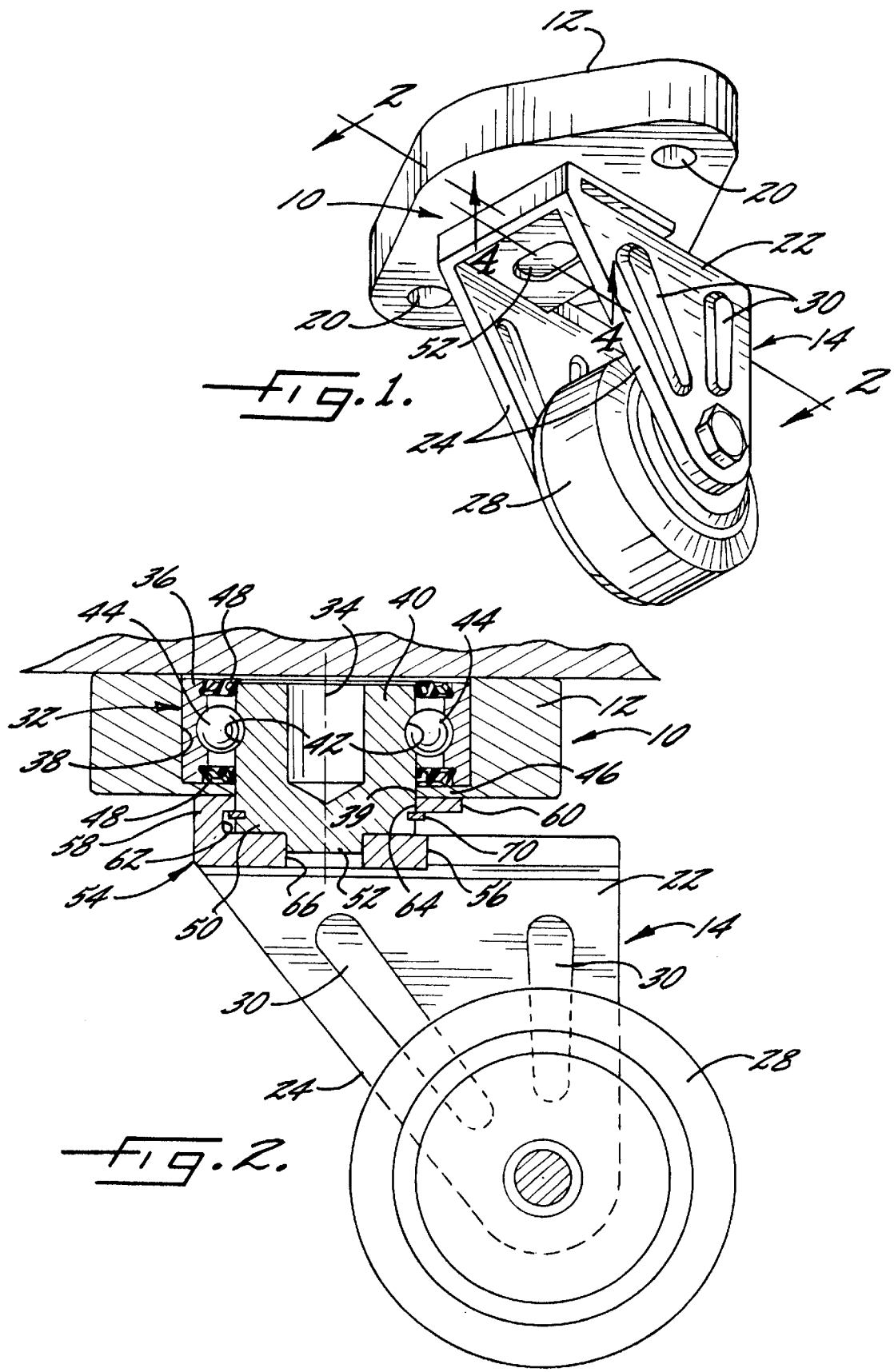

6,047,439

CASTER WHEEL WITH RELEASABLE BEARING ASSEMBLY

FIELD OF THE INVENTION

The present invention relates to caster wheel assemblies, and more particularly to an improved bearing arrangement in such caster wheel assemblies.

BACKGROUND OF THE INVENTION

Caster wheel assemblies are used for many applications including industrial conveyors, carts, portable dollies, and various other products which must be supported for rolling movement. The caster wheel assembly typically comprises a mounting flange secured to the frame of the item on which it is to be used and a wheel-carrying yoke which is supported for rotational movement about an axis perpendicular to the mounting flange. Typically, the yoke and mounting flange are permanently secured together with one or more interposed series of ball bearings for facilitating rotational movement of the yoke and wheel with respect to the mounting flange.

Since the bearing races defined or carried by the mounting flange and yoke typically are inexpensively formed of sheet metal or the like, they are subject to wear after prolonged use, which will render the caster wheel assembly inoperative and necessitate its complete removal and replacement. This can be cumbersome and time consuming necessitating unscrewing a plurality of mounting bolts, removing the caster assembly, and reassembling a replacement caster assembly again requiring handling and securement of a plurality of fasteners. Moreover, since the caster assemblies are designed for periodic replacement, the mounting and bearings utilized in such assemblies are short lived, with the yoke, mounting flange and bearings being of relatively lightweight metal, which in turn is more susceptible to failure or damage during usage.

OBJECTS AND SUMMARY OF THE INVENTION

Accordingly, in view of the foregoing, it is a general object of the present invention to provide a caster wheel assembly which enables quick and inexpensive replacement of the wheel and support yoke.

A more specific object is to provide a caster wheel assembly as characterized above which has an improved bearing assembly adapted to facilitate easy removal and replacement of the wheel and yoke from the remainder of the assembly so as to minimize the time and cost associated with repair of the caster wheel assembly.

A further object is to provide a caster wheel assembly of the above kind in which the mounting flange and bearing assembly are adapted for long lasting reliable use with inexpensively manufactured yoke and wheel assemblies that can be economically replaced as required when they become worn or are damaged.

These and other features and advantages of the invention will be more readily apparent upon reading the following description of a preferred exemplary embodiment of the invention and upon reference to the accompanying drawings wherein:

BRIEF DESCRIPTION OF THE DRAWINGS

FIG. 1 is a perspective view of an illustrative caster wheel assembly constructed in accordance with the present invention.

FIG. 2 is a cross-sectional view of the illustrative caster wheel assembly taken in the plane of line 2—2 in FIG. 1.

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENT

Figure 3:
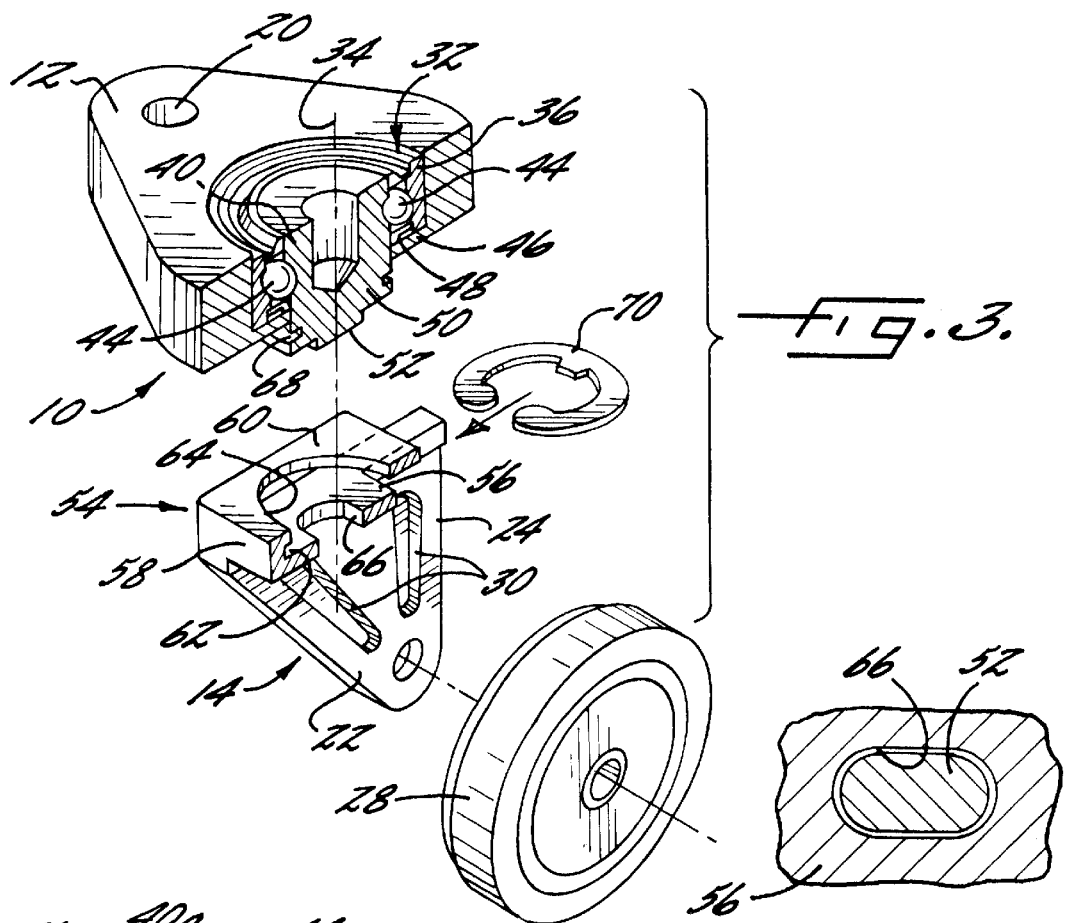
FIG. 3 is an exploded perspective sectional view of the illustrative caster wheel assembly.

Referring now more particularly to the drawings there is shown an illustrative caster wheel assembly embodying the present invention which, as will be understood by one skilled in the art, is adapted for use in many industrial and household product applications. As shown in FIGS. 1–3, the caster wheel assembly 10 basically includes a mounting member in the form of a flange 12 and a yoke and wheel subassembly 14 supported for pivotal movement about a vertical axis perpendicular to the mounting flange. The mounting flange 12 in this case has a substantially flat elongated configuration having mounting apertures 20 arranged adjacent opposing ends thereof to facilitate mounting of the caster wheel assembly 10 via appropriate mounting bolts to the base of a dolly, conveyor, cart or like product upon which the caster assembly is to be used. The yoke 22 comprises a pair of laterally spaced arms 24 between which a hinge pin extends for supporting a wheel 28 for relative rotational movement in a conventional manner. In order to provide the yoke 22 with additional structural strength and rigidity, the yoke legs 24, in the illustrated embodiment, have a plurality of stiffening ribs 30 formed therein.

In accordance with an important aspect of the invention, the yoke 22 can be detachably secured to a bearing assembly carried by the mounting flange of the caster wheel assembly to facilitate quick, easy, and inexpensive removal and replacement of the wheel and yoke subassembly. To this end, in the illustrated embodiment, the mounting flange 12 houses a bearing assembly 32 which is effective for supporting the yoke and wheel subassembly 14 for relative pivotal movement about a vertical axis 34 perpendicular to the mounting flange 12. In the illustrated embodiment, the bearing assembly has an annular outer race 36 fixed within an upwardly opening counterbore 38 in the central portion of the flange 12 and an annular inner race 40 arranged in spaced relation radially inwardly from the outer bearing race as shown in FIGS. 2 and 3. Additionally, the inner and outer races each include a grooved raceway 42 with the grooved raceways being arranged in opposed relation for receiving interposed therebetween a plurality of spaced balls or roller elements 44.

For properly positioning the bearing assembly 32, the counterbore 38 in the mounting flange 12, in this instance, defines an outer annular retaining lip 46 with a central opening 39 against which the outer race 36 is seated. More specifically, the outer race 36 is press fit within the counterbore 38 in abutting relation to the retaining lip 46 such that the upper side of the outer race 36 is substantially flush with the upper face of the mounting flange 12. An appropriate cage (not shown) may be provided which includes corresponding pockets within which the roller elements 44 are retained. Additionally, conventional seals 48 are interposed between the inner and outer bearing races 40, 36 on the opposing axial sides of the roller elements 44. The seals 48 in this case are spring lip seals of a conventional type. With the seals 48, the inner and outer bearing races 40, 36 define a sealed chamber within which the roller elements are contained and thereby protected from the outside environment.

Figure 4:
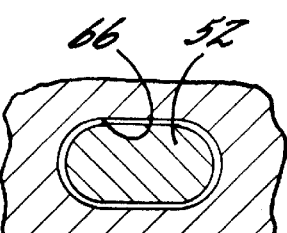
FIG. 4 is a plane cross-sectional view of the illustrative caster wheel assembly taken in the plane of lien 4—4 in FIG. 1 showing the engagement of the key with the keyway.

In carrying out the invention, for supporting the yoke 22 and, hence the yoke and wheel subassembly, the bearing, more specifically in the illustrated embodiment the inner race, has an axially downwardly extending connecting element or king pin portion 50 to which the yoke 22 can be detachably secured. The king pin portion 50, in this case, extends downwardly through the open lower end of the counterbore 38 in the mounting flange 12 to a lower terminal end which is spaced a discreet distance below the mounting flange and the inner and outer bearing races 40, 36. Additionally, the lower end of the king pin 50 is formed with an elongated key 52, as shown in FIG. 4, which facilitates engagement of the yoke 22 and the king pin.

In keeping with the invention, the yoke portion 22 of the yoke and wheel subassembly has a U-shaped mounting member 54 adapted to straddle the downwardly depending member or king pin portion 50 of the inner bearing race 40 and be releasably secured thereto. The U-shaped mounting member 54 of the yoke 22 includes a lower base 56 and an upper flange 60 disposed in spaced relation to the base with the lower base and upper flange being interconnected by an upwardly extending flange 58 so as to define a channel 62 therebetween. For enabling mounting of the yoke 22 on the bearing king pin portion 50, the upper flange 60 is formed with an aperture 64 corresponding in diameter to the bearing king pin portion 50 and the base 58 is formed with a keyway 66 shaped to receive the key 52 formed in the lower end of the king pin portion. Thus, the yoke 22 can be positioned, in a mounting position, over the king pin portion 50 and located, as shown in FIG. 2, with the upper flange 60 of the yoke positioned over the king pin portion 50 and in abutting relation with the underside of the mounting flange 12 and with the key 52 operatively disposed within the yoke keyway 66.

For releasably securing the wheel and yoke subassembly 14 in the mounted position on the bearing king pin portion 50, the king pin portion is formed with an annular groove 68 for releasably receiving a snap ring 70. As shown in FIG. 3, the snap ring 70, which in this case has an annular configuration with an opening in one side thereof, is sufficiently flexible in nature such that it can be snapped into position on the groove 68 on the bearing king pin portion 50. As shown in FIG. 3, when the U-shaped mounting member 54 is arranged over the king pin portion 50, the snap ring 70 can be conveniently snapped into locking position on the groove 68 by inserting the snap ring through any of the three open sides of the channel 62 defined by the U-shaped mounting member 54. It will be appreciated that the groove 68 is disposed in predetermined spaced relation from the underside of the caster wheel assembly mounting flange 12 such that the upper flange 60 of the U-shaped mounting member 54 of the yoke 22 is fixedly retained between the underside of the mounting flange 12 and the snap ring 70. When the wheel and yoke subassembly 14 is mounted on the king pin portion 50, the yoke 22 and inner bearing race 40 are simultaneously rotatable about the vertical axis 34, under the guidance of the bearing assembly 32, through the engagement of the key 52 and key way or slot 66.

It will be appreciated that when the wheel 28 is worn, the yoke and wheel subassembly 14 may be disassembled and removed simply by removing the snap ring 70. Likewise, a replacement wheel and yoke subassembly 14 may be assembled to the rest of the caster wheel assembly 10 simply by positioning the replacement wheel and yoke subassembly over the lower bearing king pin portion 50 into abutting relation with the underside of the mounting flange such that the key 52 engages the key way 66 and then repositioning the snap ring 70 in the retaining groove 68 of the bearing king pin portion.

Moreover, one skilled in the art will appreciate that since the wheel and yoke subassembly can be replaced independently of the mounting flange and bearing assembly, it becomes possible to provide the mounting flange and the bearing assembly with a more heavy duty design which provides better wear resistance, reliability and performance. With prior art arrangements, it was not economically practical to provide a heavy duty bearing for a caster wheel assembly since the bearing would be removed and discarded each time the wheel became worn and was replaced. Accordingly, prior art caster wheel assemblies have lower cost bearings which utilize relatively lightweight materials which are susceptible to failure or damage during use. With the present design, however, the mounting flange and bearing assembly can be adapted with a higher performance heavy-duty construction for permanent installation on the dolly or other product on which the caster assembly is to be used while the wheel and yoke subassemblies can be inexpensively manufactured yoke and simply be removed and replaced as required when it becomes worn or damaged.

Figure 5:
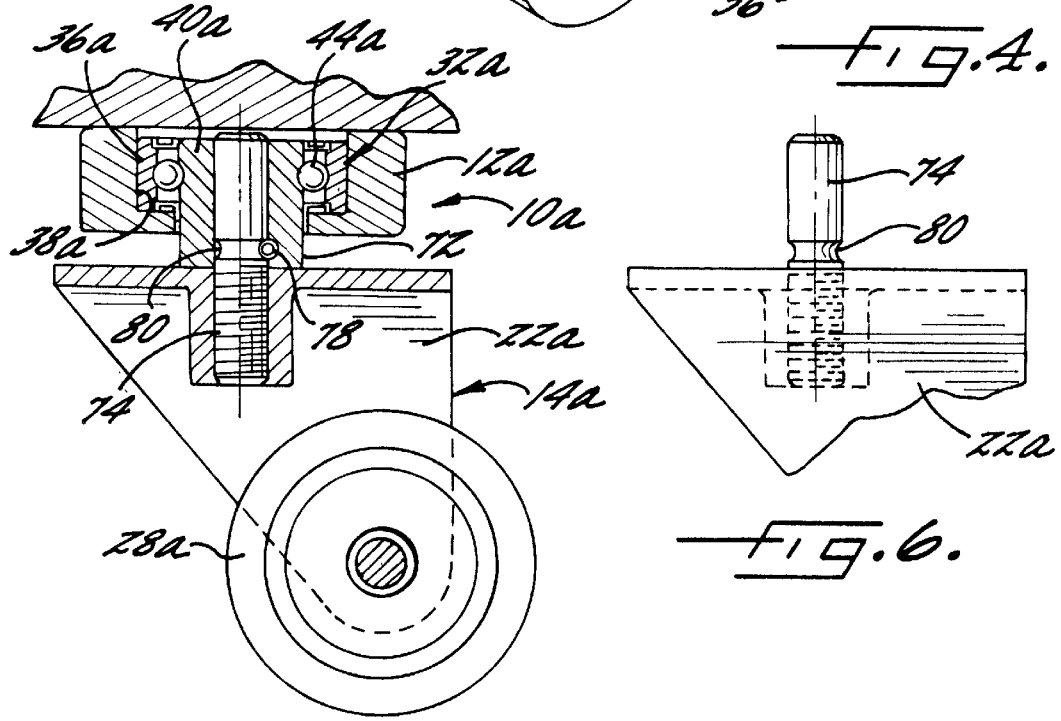
FIG. 5 is a side sectional view of an alternative embodiment of the caster wheel assembly of the present invention.
Figure 6:
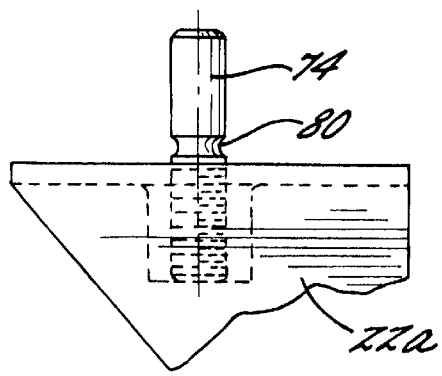
FIG. 6 is an enlarged fragmentary view of the king pin of the caster wheel assembly of FIG. 5.

Referring now more particularly to FIGS. 5–6 there is shown an alternative embodiment of a caster wheel assembly according to the present invention wherein items similar to those described above have been given similar reference numerals with the distinguishing suffix "a" added. The caster wheel assembly 10a again includes a wheel and yoke subassembly 14a and a caster wheel assembly mounting flange 12a which also serves as a bearing housing. As shown in FIG. 5, the mounting flange 12a has an upwardly opening counterbore 38a which receives and seats a roller bearing assembly 32a comprising an outer race 36a, an inner race 40a and rolling elements 44a interposed therebetween. The inner bearing race 40a has a lower extension portion 72 which extends in an axial direction relative to the inner race through the open lower end of the counterbore 38a in the mounting flange 12a.

For releasably securing the yoke and wheel subassembly to the inner bearing race, the yoke 22a includes an upwardly extending connecting element or king pin portion 74 which is adapted for releasable securement to the inner bearing race 40a. In the illustrated embodiment, the king pin portion 50a is defined by a pin which is threaded into a threaded aperture in the upper surface of the yoke 22a, with a portion of the pin disposed in upstanding relation thereto. In order to secure the yoke king pin portion 74 to the inner bearing race 40a, the yoke king pin 74 is positionable into a central opening 76 in the inner bearing race, and is secured thereto by means of a set screw 78 which extends through a side wall of the inner race depending portion 72 and engages a retaining groove 80 in the yoke king pin portion 74. It can be seen that with the yoke king pin portion 74 secured to the inner bearing race 40a by the set screw 78, the yoke and inner bearing race will rotate in unison, under guidance of the bearing assembly 32a. The yoke and wheel subassembly moreover, are readily removable and replaceable by simply unscrewing the set screw 78. However, instead of being part of the bearing assembly as in the embodiment shown in FIGS. 1–4, the kin pin portion is affixed, in this case threaded, to the base of the yoke and is releasably secured to the bearing.

From the foregoing, it can be seen that a caster wheel assembly is provided which enables the wheel and yoke to be quickly and inexpensively replaced without necessitating the removal and replacement of the bearing assembly. Thus, the bearing assembly may be designed with a higher performance heavy duty construction for long-term use while the wheel and yoke subassembly can have an inexpensive construction and simply be removed and replaced when it becomes worn or damaged. Accordingly, the bearing assembly provides much more reliable operation than the inexpensively manufactured bearing assemblies used in prior art caster assemblies.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and the scope of the invention as defined by the following claims.

What is claimed is:

1. A caster wheel assembly for supporting an item for rolling movement comprising:
    a bearing assembly including an inner race and an outer race disposed concentrically about the inner race for relative rotational movement, a plurality of roller elements interposed between said inner and outer races,
    a yoke having a wheel supported for relative rotational movement,
    a connecting element having one end fixed to one of said yoke or one race of the bearing assembly and another end removeably positionable in operative relation to the other of said yoke or one race, and
    a removeably engageable retention member for securing the other one of said yoke or one race in operative relation to other end of said connecting element such that said yoke and one race are rotatable in unison relative to the other of said races, and said retention member being removable to permit removal of said yoke from said bearing assembly for replacement.

2. The caster wheel assembly according to claim 1 in which said connecting element is affixed to said inner race and the other end of said connecting element depends beyond a lower surface of said bearing assembly, and said retention member secures said yoke in operative relation to the depending other end of said connecting element.

3. The caster wheel assembly according to claim 1 in which said connecting element is affixed to said yoke and the other end of said connecting element extends upwardly above an upper surface of said yoke.

4. The caster wheel assembly according to claim 3 in which said retention member secures said other upwardly extending end of said connecting element in operative relation to said inner bearing race.

5. The caster wheel assembly according to claim 1 wherein said retention member comprises a snap ring which engages a groove in said connecting element.

6. The caster wheel assembly according to claim 1 including a mounting member for securement to said item, and said mounting member carrying said bearing assembly.

7. The caster wheel assembly according to claim 6 in which said outer race is mounted in fixed relation to said mounting member.

8. The caster wheel assembly according to claim 6 wherein said bearing assembly is arranged in an opening in said mounting member.

9. The caster wheel assembly according to claim 8 wherein said outer bearing race abuts against an annular retaining lip defined by said opening in said mounting member at the lower end thereof.

10. The caster wheel assembly according to claim 1 in which said connecting element is defined by a lower depending extension of said inner bearing race.

11. The caster wheel assembly according to claim 10 wherein a key is formed on said lower depending extension of said inner bearing race and a keyway is provided on said yoke.

12. A caster wheel assembly for supporting an item for rolling movement comprising:
    a bearing assembly including an inner race and an outer race disposed concentrically about the inner race for relative rotational movement, said inner race having an extension that extends beyond a lower surface of the bearing assembly, a plurality of roller elements interposed between said inner and outer races,
    a yoke having a wheel supported for relative rotational movement, said yoke including a mounting structure positionable over said inner bearing race extension, and
    a retention member selectively engageable with said yoke mounting structure and said inner bearing race extension for securing the yoke on said inner bearing race extension such that said inner bearing race and yoke are rotatable in unison relative to said outer bearing race, and,
    said retention member being selectively releasable to permit removal of said yoke from said bearing assembly for replacement.

13. The caster wheel assembly according to claim 12 including a mounting member for securement to said item, and said bearing assembly being disposed in an opening in said mounting member.

14. The caster wheel assembly according to claim 13 wherein said outer bearing race abuts against an annular retaining lip defined by said opening in said mounting member at a lower end thereof.

15. The caster wheel assembly according to claim 12 wherein said retention member comprises a snap ring which engages a groove in said inner bearing race extension.

16. The caster wheel assembly according to claim 12 wherein said retention member comprises a snap ring.

17. A caster wheel assembly for supporting an item for rolling movement comprising:
    a bearing assembly including an inner race and an outer race disposed concentrically about the inner race for relative rotational movement, a plurality of roller elements interposed between said inner and outer races,
    a yoke that rotatably supports a wheel, said yoke including an upwardly extending portion, and
    a selectively engageable retention member for securing said upwardly extending yoke portion in operative engaging relation with said inner bearing race such that said yoke and inner bearing race are rotatable in unison relative to said outer bearing race, and
    said retention member being selectively releasable to permit removal of said yoke from said bearing assembly for replacement.

18. The caster wheel assembly according to claim 17 wherein said upwardly extending yoke portion is receivable in an opening in said inner bearing race.

19. The caster wheel assembly according to claim 17 wherein said retention member comprises a set screw.

20. The caster wheel assembly according to claim 17 wherein upwardly extending yoke portion comprises a pin which is threaded into a threaded aperture in the upper surface of the yoke.

21. The caster wheel assembly according to claim 17 including a mounting member for securement to said item, and said bearing assembly is disposed in an opening in said mounting member.

22. The caster wheel assembly according to claim 21 wherein said outer bearing race abuts against an annular retaining lip defined by said opening in said mounting flange at a lower end thereof.

23. A caster wheel assembly for supporting an item for rolling movement comprising:
   a bearing assembly including an inner race and an outer race disposed concentrically about the inner race for relative rotational movement,
   a yoke having a wheel supported for relative rotational movement,
   a connecting element having one end fixed to one of said yoke or one race of the bearing assembly and another end formed with a key removeably positionable in operative relation in a keyway provided in the other of said yoke or one race, and
   a removeably engageable retention member for securing the other one of said yoke or one race in operative relation to other end of said connecting element.

24. The caster wheel assembly according to claim 23 wherein said yoke has a generally U-shaped mounting structure comprising a lower base and an upper flange disposed in spaced relation to the base so as to define a channel therebetween.

25. The caster wheel assembly according to claim 24 wherein said upper flange includes an opening for enabling the yoke mounting structure to be positioned over the inner bearing race extension and wherein said keyway is arranged in said base portion.

26. The caster wheel assembly according to claim 25 wherein said retention member is insertable in said channel between said upper flange and said lower base of the yoke mounting structure and is engageable with said upper flange.

27. The caster wheel assembly according to claim 26 wherein said retention member engages a groove in said inner bearing race extension.

28. The caster wheel assembly according to claim 27 wherein said retention member comprises a snap ring.

29. A caster wheel assembly for supporting an item for rolling movement comprising:
   a bearing assembly including an inner race and an outer race disposed concentrically about the inner race for relative rotational movement, said inner race having an extension that extends beyond a lower surface of said outer race,
   a yoke having a wheel supported for relative rotational movement, said yoke including a mounting structure positionable over said inner bearing race extension, and
   a retention member selectively engageable with said yoke mounting structure and said inner bearing race extension for releasably securing the yoke on said inner bearing race extension, said yoke mounting structure having a keyway, and said inner bearing race extension having a key that is operatively disposed in said keyway when said yoke mounting structure is positioned over said inner bearing race extension.

30. The caster wheel assembly according to claim 29 wherein said yoke mounting structure has a generally U-shape comprising a lower base and an upper flange disposed in spaced relation to the base so as to define a channel therebetween.

31. The caster wheel assembly according to claim 30 wherein said upper flange includes an opening for enabling the yoke mounting structure to be positioned over the inner bearing race extension and wherein said keyway is arranged in said base portion.

32. The caster wheel assembly according to claim 31 wherein said retention member is insertable in said channel between said upper flange and said lower base of the yoke mounting structure and is engageable with said upper flange.

33. The caster wheel assembly according to claim 32 wherein said retention member engages a groove in said inner bearing race extension.

34. A caster wheel assembly for supporting an item for rolling movement comprising:
   a bearing assembly including an inner race and an outer race disposed concentrically about the inner race for relative rotational movement, a plurality of roller elements interposed between said inner and outer races,
   a yoke that rotatably supports a wheel,
   a retention member for securing said yoke to one of said inner and outer races for rotation in unison with said one of said inner and outer races relative to the other of said inner and outer races, and
   said retention member being releasable to permit removal of said yoke from said bearing assembly.

35. The caster wheel assembly according to claim 34 in which said retention member releasably secures said yoke to said inner race.

36. The caster wheel assembly according to claim 35 in which said inner race has a lower depending extension, and said retention member releasably secures said yoke to said inner bearing race extension.

37. The caster wheel assembly according to claim 35 which said yoke has an upstanding connection element and said retention member releasably secures said yoke connection element to said inner bearing race.

\* \* \* \* \*